(12) United States Patent
Zalesak et al.

(10) Patent No.: US 6,378,339 B1
(45) Date of Patent: Apr. 30, 2002

(54) APPARATUS AND METHOD FOR GLASS SHEET FORMING

(75) Inventors: Thomas J. Zalesak, Rossford; Alfredo Serrano, Maumee, both of OH (US)

(73) Assignee: Glasstech, Inc., Plymouth, MI (US)

( * ) Notice: Subject to any disclaimer, the term of this patent is extended or adjusted under 35 U.S.C. 154(b) by 29 days.

(21) Appl. No.: 09/655,169

(22) Filed: Sep. 5, 2000

(51) Int. Cl.⁷ .................................. C03B 23/033
(52) U.S. Cl. ...................... 65/104; 65/106; 65/114; 65/268; 65/273
(58) Field of Search .................. 65/104, 106, 114, 65/118, 119, 273, 268

(56) References Cited

U.S. PATENT DOCUMENTS

| | | |
|---|---|---|
| 4,883,527 A | 11/1989 | McMaster et al. |
| 5,009,693 A | 4/1991 | Friedel et al. |
| 5,498,275 A | 3/1996 | Reunamaki |
| 5,556,444 A | 9/1996 | Reunamaki |
| 5,697,999 A | 12/1997 | Reunamaki |
| 6,192,710 B1 * | 2/2001 | Takeda et al. ............... 65/107 |

* cited by examiner

Primary Examiner—Sean Vincent
(74) Attorney, Agent, or Firm—Brooks & Kushman P.C.

(57) ABSTRACT

A glass sheet forming system (10) includes apparatus (12) having a forming station (22) for forming glass sheets by cooperation of a lower deformable roll forming conveyor (26) and an upper deformable roll forming press (32). The upper deformable roll forming press (32) includes upper deformable rolls (34) whose axes are located along a direction of conveyance between the axes of lower deformable rolls (28) of the lower deformable roll forming conveyor (26) in a manner that prevents leading glass edge curling as the lower conveyor and upper forming press are moved between flat and curved shapes to provide glass sheet forming.

14 Claims, 6 Drawing Sheets

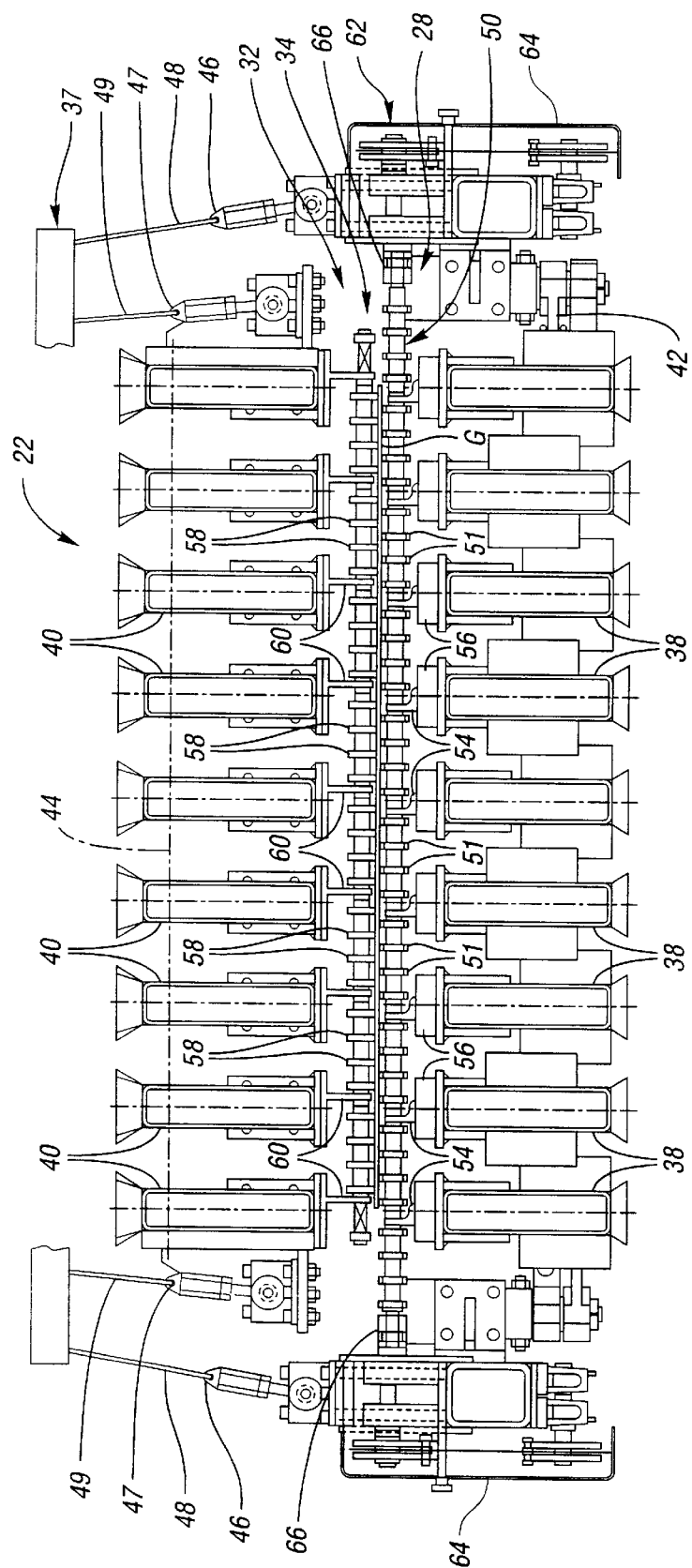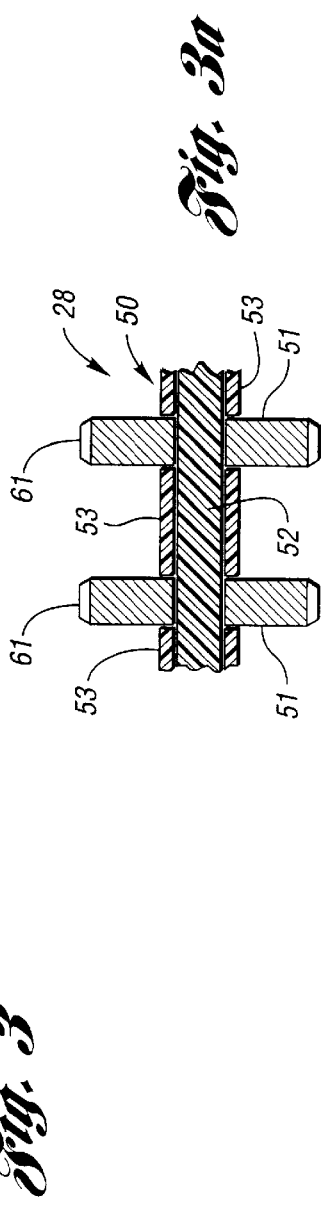

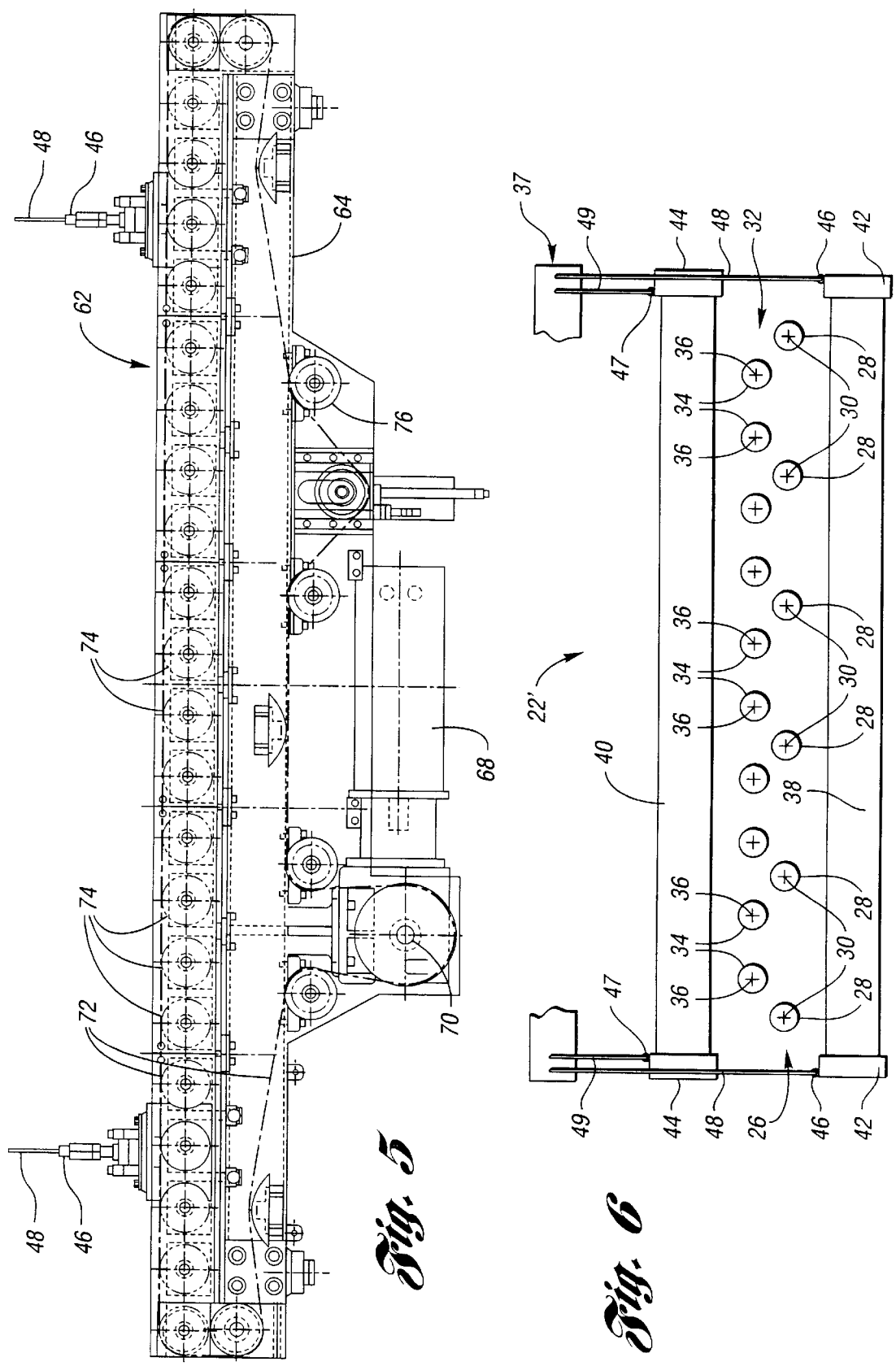

APPARATUS AND METHOD FOR GLASS SHEET FORMING

TECHNICAL FIELD

This invention relates to apparatus and to a method for forming heated glass sheets.

1. Background Art

U.S. Pat. Nos. 5,498,275, 5,556,444, and 5,697,999 of Reunamaki disclose a glass sheet forming system for forming heated glass sheets during conveyance along a direction of movement of the glass sheet through the system. The forming is provided by lower and upper sets of deformable rolls that are vertically aligned with each other along the direction of conveyance and supported by associated members that are movable to move the lower and upper sets of rolls between a flat condition for receiving a heated glass sheet from an associated furnace and a curved condition for forming the glass sheet to a curved shape along a direction transverse to the direction of conveyance. Other glass sheet forming that is performed during movement of the glass along a direction of conveyance is disclosed by U.S. Pat. No. 4,883,527 McMaster et al. and U.S. Pat. No. 5,009,693 Freidel et al.

2. Disclosure of Invention

An object of the present invention is to provide improved apparatus for forming glass sheets.

In carrying out the above object, the apparatus constructed in accordance with the invention includes a furnace having a heating chamber and also includes a conveyor for conveying glass sheets along a direction of conveyance through the heating chamber of the furnace for heating to a forming temperature. A forming station of the apparatus is located downstream from the furnace along the direction of conveyance and includes a lower deformable roll forming conveyor having lower deformable rolls rotatable about associated axes at spaced intervals along the direction of conveyance. The forming station also includes an upper deformable roll forming press located above the lower deformable roll forming conveyor in an opposed relationship to receive a heated glass sheet from the furnace. The upper deformable roll forming press has upper deformable rolls rotatable about associated axes at spaced intervals along the direction of conveyance between the axes of the lower deformable rolls. An actuating mechanism of the system moves the lower deformable roll forming conveyor and the upper deformable roll forming press between flat shapes for receiving the heated glass sheet from the furnace and curved shapes for forming the heated glass sheet.

In the preferred construction, the lower deformable rolls each include a flexible shaft and roll discs spaced along the flexible shaft, and the upper deformable rolls each include roll discs. Furthermore, the apparatus includes a drive mechanism for rotatively driving the lower deformable rolls, and the upper deformable rolls are undriven idler rolls.

In one embodiment between each adjacent pair of lower deformable rolls, there is a single upper deformable roll whose axis is located along the direction of conveyance between the axes of the adjacent pair of lower deformable rolls. In the preferred construction of this embodiment, the axis of each upper deformable roll is located downstream from a midpoint along the direction of conveyance between the axes of the adjacent pair of lower deformable rolls.

Between each adjacent pair of lower deformable rolls of another embodiment, there are a plurality of upper deformable rolls whose axes are located along the direction of conveyance between the axes of the adjacent pair of lower deformable rolls.

The apparatus also may include a cooling station located downstream along the direction of conveyance from the forming station and having lower and upper quench heads for supplying quenching gas and also including a roll conveyor for conveying the formed glass sheet between the quench heads for cooling by the quenching gas supplied from the quench heads. This cooling station has an adjustment mechanism for adjusting the lower and upper quench heads and the roll conveyor of the cooling station to provide different curvatures for different curvatures of formed glass sheets.

Another object of the present invention is to provide a method for forming glass sheets.

In carrying out the immediately preceding object, the glass sheet forming method of the invention is performed by conveying a glass sheet along a direction of conveyance through a heating chamber of a furnace for heating to a sufficiently high temperature to permit forming of the glass sheet. The heated glass sheet is transferred from the furnace to a forming station between a lower deformable roll forming conveyor and an upper deformable roll forming press that respectively have lower deformable rolls rotatable about associated axes at spaced intervals along the direction of conveyance and upper deformable rolls rotatable about associated axes at spaced intervals along the direction of conveyance between the axes of the lower deformable rolls. The lower deformable roll forming face and the upper deformable roll forming conveyor are moved between flat shapes at which the heated glass sheet is received from the furnace and curved shapes for forming the heated glass sheet.

In performing the glass sheet forming, the lower deformable rolls are rotatively driven and the upper deformable rolls are undriven idler rolls.

The glass sheet forming may also include transferring of the formed glass sheet from the forming station to a conveyor of a cooling station between lower and upper quench heads for supplying quenching gas that cools the glass sheet. The lower and upper quench heads are adjustable to different curved shapes between different production jobs to permit cooling of different curved shapes of formed glass sheets.

The objects, features and advantages of the present invention are readily apparent from the following detailed description of the best mode for carrying out the invention when taken in connection with the accompanying drawings.

BRIEF DESCRIPTION OF DRAWINGS

FIG. 3 is a cross sectional view taken through the forming station along the direction of line 3—3 in FIG. 2 and showing a lower deformable roll conveyor and an upper deformable roll forming press positioned in a flat position for receiving a heated glass sheet to be formed.

FIG. 3a is a sectional view taken along the direction of line 3a—3a of FIG. 3 to illustrate the construction of the lower and upper forming rolls of the roll conveyor and forming press.

FIG. 5 is a view of a drive mechanism of the lower deformable roll forming conveyor and is taken along the direction of line 5—5 in FIG. 3.

FIG. 6 is a view similar to FIG. 2 of an alternate embodiment of the forming station.

BEST MODE FOR CARRYING OUT THE INVENTION

Figure 1:
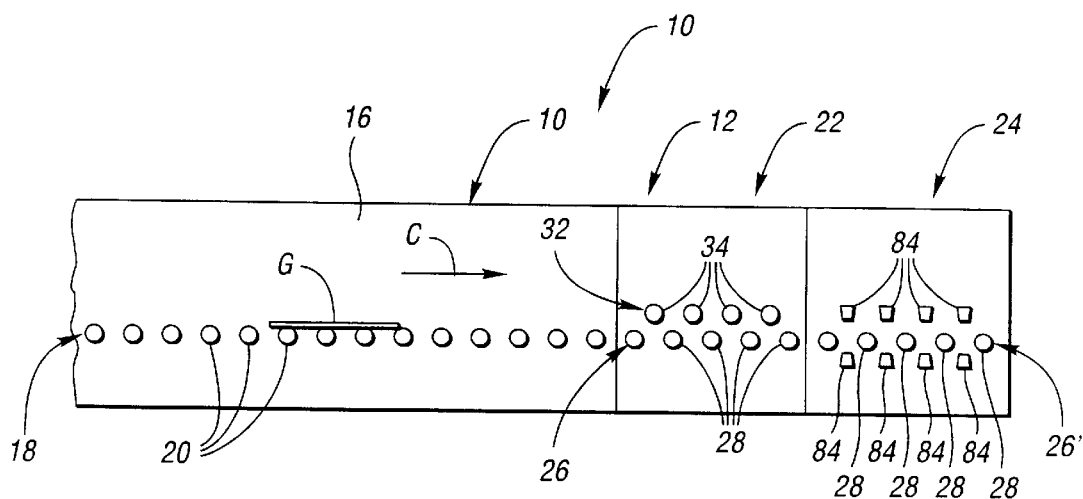
FIG. 1 is a schematic elevational side view of a glass sheet processing system that includes forming apparatus constructed in accordance with the present invention to perform the method of the invention.

With reference to FIG. 1, a glass sheet forming system is generally indicated by 10 and includes apparatus 12 constructed in accordance with the invention as is hereinafter more fully described. The forming system apparatus 12 and its method of operation will be described in an integrated manner to facilitate an understanding of all aspects of the invention. The glass sheet forming system 10 includes a furnace 14 having a heating chamber 16 and a conveyor 18 that is located within the heating chamber to convey glass sheets G along a direction of conveyance shown by arrow C. As illustrated, the conveyor 18 includes rolls 20 that convey the glass sheets G through the heating chamber 16 for heating to a forming temperature. A forming station 22 of the system 10 is located downstream from the furnace 14 to receive the heated glass sheets for forming as is also hereinafter more fully described. The forming system 10 also includes a cooling station 24 for cooling the formed glass sheet as is also hereinafter more fully described.

Figure 2:
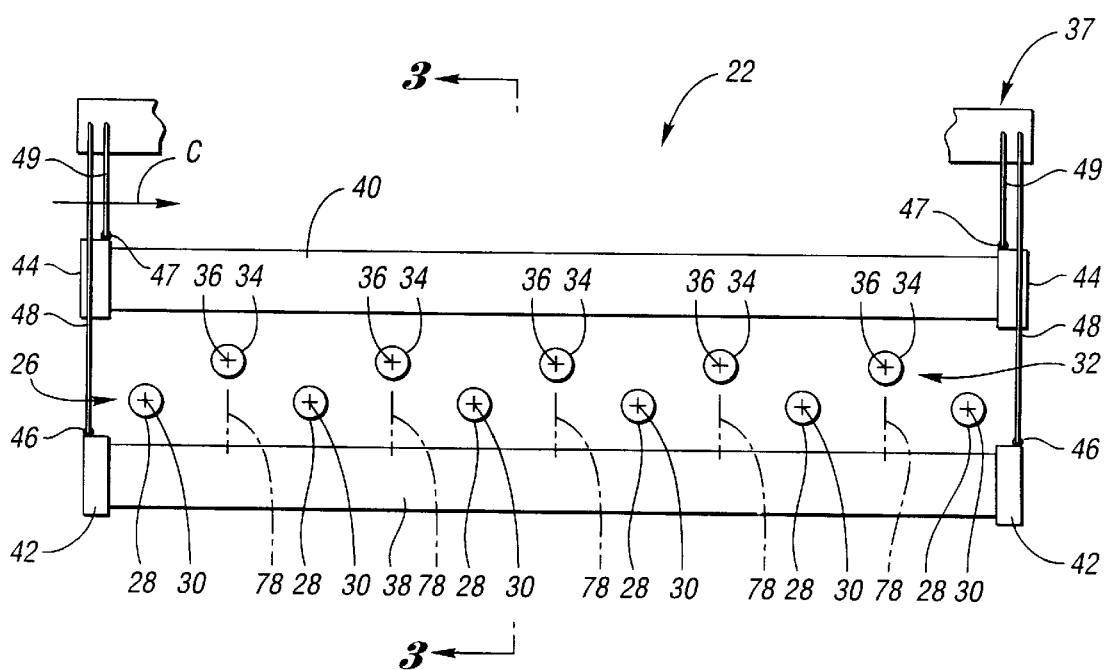
FIG. 2 is a schematic side view of a forming station of the system.

With combined reference to FIGS. 1 and 2, the forming station 22 is located downstream from the furnace 14 along the direction of conveyance C and includes a lower deformable roll forming conveyor 26 that has lower deformable rolls 28 rotatable about associated axes 30 at spaced intervals along the direction of conveyance. The forming station also includes an upper deformable roll forming press 32 having upper deformable rolls 34 rotatable about associated axes 36 at spaced intervals along the direction of conveyance between the axes 30 of the lower deformable rolls 28. An actuating mechanism collectively indicated by 37 moves the lower deformable roll forming conveyor 26 and the upper deformable roll forming press 32 between flat shapes as shown in FIG. 3 and the curved shapes shown in FIG. 4 for forming the heated glass sheet G upon conveyance along the forming station.

The construction and operation of the forming station 22 as described above prevents the leading and trailing edges of the glass sheet from curling as can happen when the lower and upper rolls are aligned with each other along the direction of conveyance.

In the construction of the forming station 22 disclosed, the lower deformable rolls 28 of the lower deformable roll forming conveyor 26 are mounted on a plurality of elongated members 38 as shown in FIGS. 2 and 3. Likewise, the upper deformable rolls 34 of the upper deformable roll forming press 32 are mounted on elongated members 40. The adjacent ends of the elongated members 38 and 40 are connected to each other by schematically illustrated associated linkages 42 and 44 that restrain the member to move the deformable rolls 28 and 36 in partially circular shapes. The opposite ends of the linkages 42 and 44 have associated connections 46 and 47 (FIGS. 3 and 4) to connector chains 48 and 49 of the actuating mechanism 37. The actuating mechanism 37 and the linkages 42 and 44 as well as other components of the system may have the constructions disclosed by U.S. Pat. Nos. 5,498,275, 5,556,444, and 5,697,999 of Reunamaki, the entire disclosures of which are hereby incorporated by reference.

Figure 4:
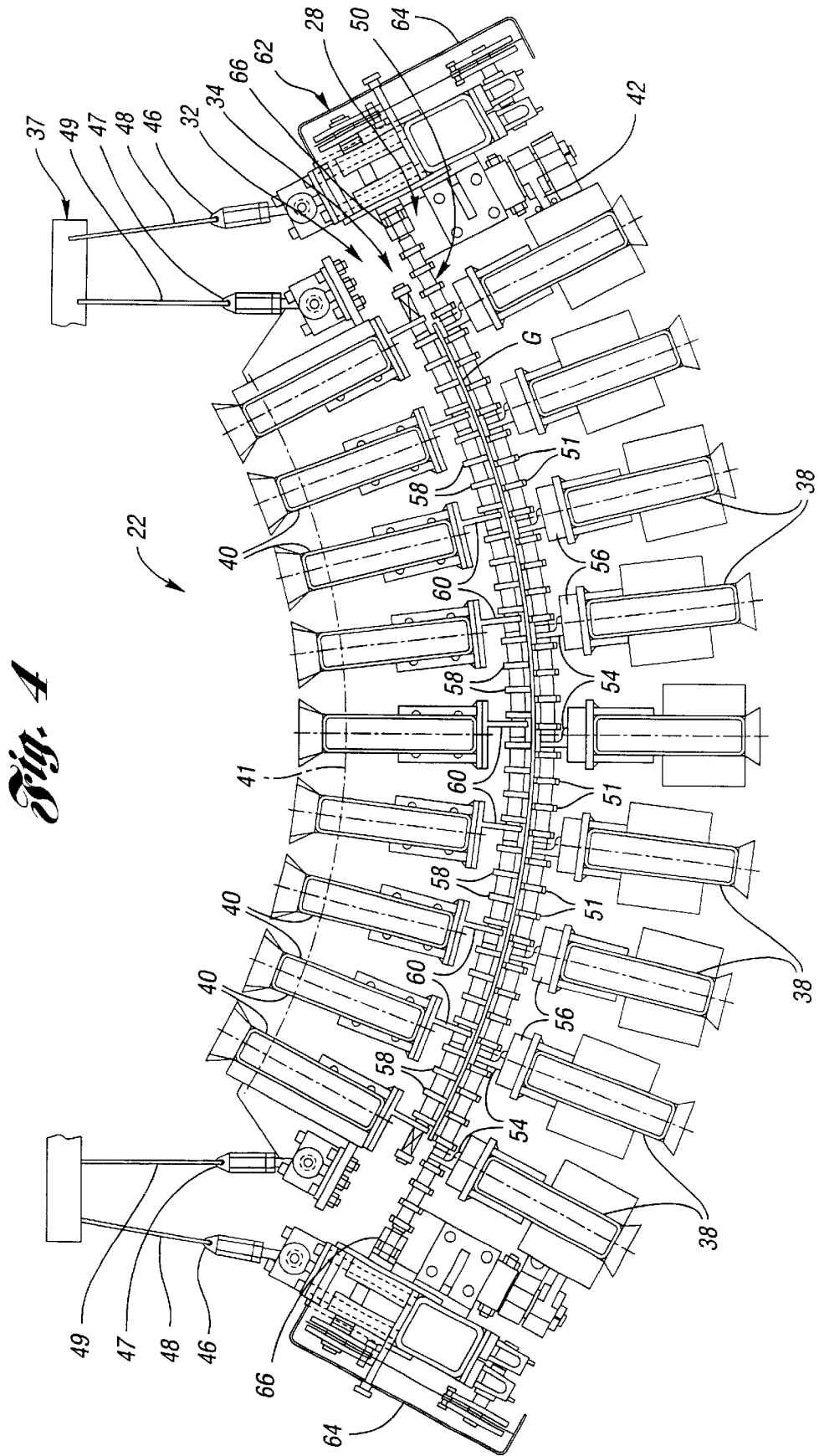
FIG. 4 is a cross sectional view through the forming station taken in the same direction as FIG. 3 but with the lower deformable roll forming conveyor and the upper deformable roll forming press in curved shapes that provide the forming of the heated glass sheet.

With reference to FIGS. 3, 3a and 4, the lower deformable rolls 28 each include a flexible shaft 50 and roll discs 51 spaced along the flexible shaft. More specifically, the flexible shaft 50 includes a center plastic spline 52 that is inserted through short tubular spacers 53 whose ends engage the roll discs 51 to provide their spacing from each other. Furthermore, journals 54 support the flexible shaft 50 by mounts 56 on the lower elongated members 38. In addition, the upper deformable rolls 34 each include a roll shaft 57 of the same construction as the lower flexible shaft 50 such that its roll discs 58 are spaced along a center plastic spline by short tubular spacers through which the spline extends. Journals 60 mount the upper roll shafts 57 on the upper elongated members 40. Both the roll discs 51 of the lower deformable rolls 30 and the roll discs 58 of the upper deformable rolls 34 have annular outer cloth coverings 61 (FIG. 3a) of an aromatic polyamide fiber.

With combined reference to FIGS. 3–5, the forming station includes a drive mechanism 62 that has a pair of elongated members 64 at opposite lateral sides of the conveyor. Drive journals 66 as shown in FIGS. 3 and 4 mount the opposite ends of the lower deformable rolls 28 on the members 64. Each member 64 as shown in FIG. 5 includes an electric motor 68 whose output 70 drives a continuous chain 72 to drive sprockets 74 on the adjacent lower deformable roll ends. A tension adjuster sprocket 76 provides the proper tensioning of the chain 72 during the roll driving. This driving of the lower deformable rolls is performed as the flat glass sheet is received between the lower deformable roll forming conveyor 26 and the upper deformable roll forming press 32 as well as during the movement thereof to the curved shapes to form the glass sheet as previously described. While the lower deformable rolls 28 are rotatively driven, the upper deformable rolls 34 are undriven idler rolls. At the beginning of each cycle, a computer control signal moves the upper deformable roll forming press 32 downwardly into close proximity to the lower deformable roll forming conveyor 26 whereupon movement to the curved shapes forms the glass sheet. The upper deformable roll forming press 32 stays in the lower position until the formed glass exits the forming station 22 and then moves upwardly and back to its flat shape as does the lower deformable roll forming conveyor 26.

In the embodiment illustrated in FIG. 2, there is a single upper deformable roll 34 whose axis 36 is located along the direction of conveyance between the axes 30 of the adjacent pair of lower deformable rolls 28. More specifically, the axis 36 of each upper deformable roll 34 is located downstream from a midpoint 78 along the direction of conveyance between the axes 30 of the adjacent pair of lower deformable rolls. This downstream location of the upper deformable roll axes with respect to the midpoint 78 has been found to be effective in eliminating the leading edge curl of the formed glass sheets.

With reference to FIG. 6, another embodiment of the forming station 22' has the same construction as the previously described embodiment except that its upper deformable roll forming press 32 includes a plurality of upper deformable rolls 34 whose axes 36 are located along the direction of conveyance between the axes 30 of the adjacent pair of lower deformable rolls 28. More specifically, two upper deformable rolls 34 are shown with their axes 36 located between the axes 30 of each adjacent pair of lower deformable rolls and, while there could be more, the available space restricts the number that can be utilized.

Figure 7:
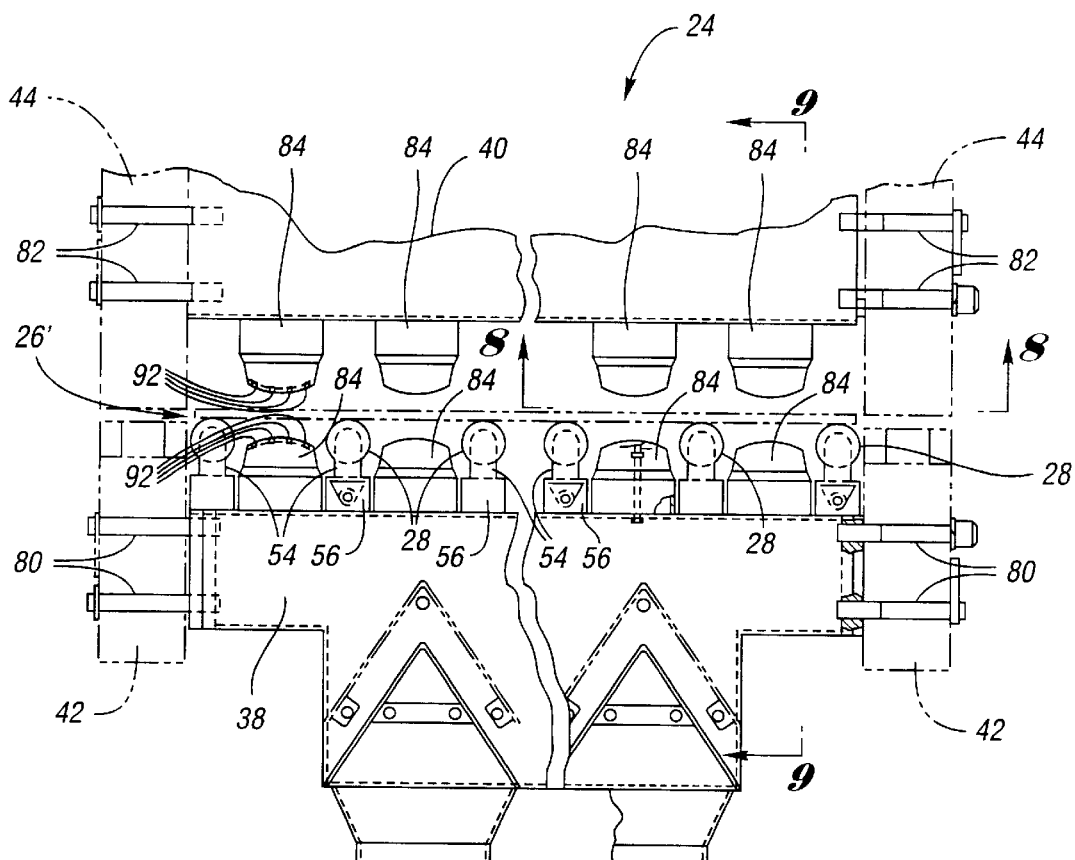
FIG. 7 is an enlarged view of the cooling station of the system and is taken in the same direction as FIG. 1.

The cooling station 24 is shown in FIG. 1 as being located downstream along the direction of conveyance from the forming station 22. This cooling station has a construction similar to the forming station such that like components are identified by like reference numerals and much of the previous description is also applicable. Thus, the lower conveyor 26' as shown in FIG. 7 has lower deformable rollers 28 supported on its lower elongated members 38 by the mounts 56 and journals 54, but there are no upper rolls like in the forming station. Furthermore, the lower linkages 42 both have connectors 80 to the opposite ends of the lower members 38, and the upper linkages 44 both have connectors 82 to the opposite ends of the upper elongated members 40.

Figure 8:
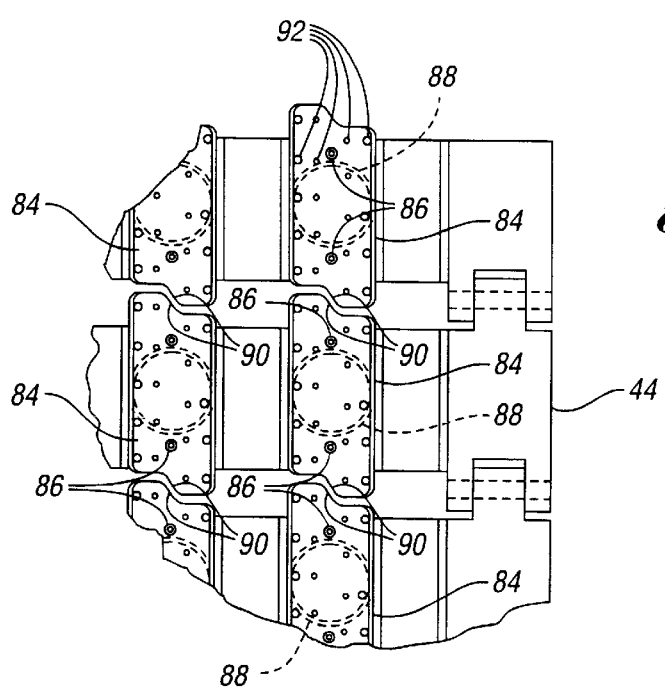
FIG. 8 is a bottom plan view taken along the direction of line 8—8 in FIG. 7 to illustrate quench heads that deliver quenching gas for providing the cooling.

With continuing reference to FIG. 7, the lower and upper elongated members 38 and 40 of the cooling station function as quench tubes and respectively mount quench plenums 84. Each quench plenum 84 has a two-piece cast aluminum construction which is secured by connectors 86 (FIG. 8) such that a round inlet 88 of each quench plenum supplies the quenching gas from the associated elongated quench tube member. Quench plenums 84 have ends 90 that interfit and thereby permit quench openings 92 in the quench plenums to be located relatively close to each other to provide uniform quenching.

Figure 9:
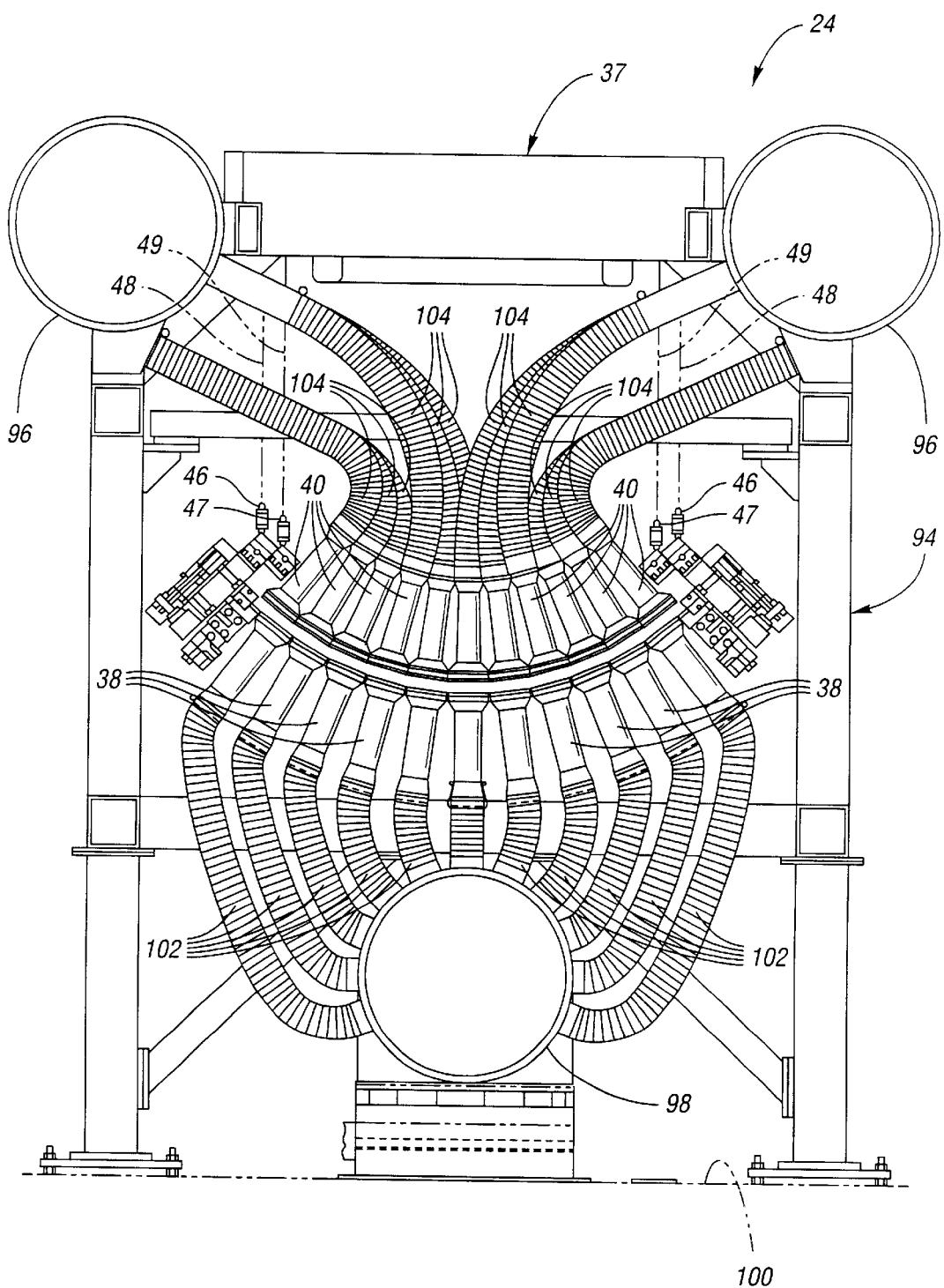
FIG. 9 is a cross sectional view taken through the cooling station along the direction of line 9—9 in FIG. 7 to show its curved shape for receiving the heated glass sheet.

With reference to FIG. 9, the cooling station 24 includes a framework 94 that supports a pair of upper quench tubes 96 that have elongated round shapes like a lower quench tube 98 that is mounted on the factory floor 100. The framework 94 is also supported on the factory floor 100 and at its upper extremity supports the actuating mechanism 37. Flexible quench conduits 102 extend between the lower quench duct 98 and the lower elongated members 38 to supply quenching gas to their quench plenurns. Likewise, flexible quench conduits 104 extend between the upper quench ducts 100 and the upper elongated members 40 to supply quenching gas to their quench plenums.

The actuating mechanism 37 of the cooling station 24 shown in FIG. 9 has chain connectors 48 and 49 that support the lower and upper linkages 42 and 44 that respectively support the lower and upper elongated members 38 and 40 as previously described. However, the actuating mechanism 37 is only adjusted during a change in production jobs where the curvature of the resultant part changes, unlike the forming station where the lower deformable roll forming conveyor and the upper deformable roll forming press are moved between the flat and curved shapes during each cycle of operation.

While the best mode for carrying out the invention has been described in detail, those familiar with the art to which this invention relates will recognize various alternative ways for practicing the invention as defined by the following claims.

What is claimed is:

1. Apparatus for forming glass sheets, comprising:
a furnace including a heating chamber;
a conveyor for conveying glass sheets along a direction of conveyance through the heating chamber of the furnace for heating to a forming temperature;
a forming station located downstream from the furnace along the direction of conveyance and including a lower deformable roll forming conveyor having lower deformable rolls rotatable about associated axes at spaced intervals along the direction of conveyance, the forming station also including an upper deformable roll forming press located above the lower deformable roll forming conveyor in an opposed relationship to receive a heated glass sheet from the furnace, and the upper deformable roll forming press having upper deformable rolls rotatable about associated axes at spaced intervals along the direction of conveyance between the axes of the lower deformable rolls; and
an actuating mechanism that moves the lower deformable roll forming conveyor and the upper deformable roll forming press between flat shapes for receiving the heated glass sheet from the furnace and curved shapes for forming the heated glass sheet.

2. Apparatus for forming glass sheets as in claim 1 wherein the lower deformable rolls each include a flexible shaft and roll discs spaced along the flexible shaft, and the upper deformable rolls each including roll discs.

3. Apparatus for forming glass sheets as in claim 1 further including a drive mechanism for rotatively driving the lower deformable rolls, and the upper deformable rolls being idler rolls.

4. Apparatus for forming glass sheets as in claim 1 wherein between each adjacent pair of lower deformable rolls there is a single upper deformable roll whose axis is located along the direction of conveyance between the axes of the adjacent pair of lower deformable rolls.

5. Apparatus for forming glass sheets as in claim 4 wherein the axis of each upper deformable roll is located downstream from a midpoint along the direction of conveyance between the axes of the adjacent pair of lower deformable rolls.

6. Apparatus for forming glass sheets as in claim 1 wherein between each adjacent pair of lower deformable rolls there are a plurality of upper deformable rolls whose axes are located along the direction of conveyance between the axes of the adjacent pair of lower deformable rolls.

7. Apparatus for forming glass sheets as in claim 1 further including a cooling station located downstream along the direction of conveyance from the forming station and including lower and upper quench heads for supplying quenching gas and also including a roll conveyor for conveying the formed glass sheet between the quench heads for cooling by the quenching gas supplied from the quench heads.

8. Apparatus for forming glass sheets as in claim 7 wherein the cooling station has an adjustment mechanism for adjusting the lower and upper quench heads and the roll conveyor of the cooling station to provide different curvatures for difference curvatures of formed glass sheets.

9. Apparatus for forming glass sheets, comprising:
a furnace including a heating chamber;
a conveyor for conveying glass sheets along a direction of conveyance through the heating chamber of the furnace for heating to a forming temperature;
a forming station located downstream from the furnace along the direction of conveyance and including a lower deformable roll forming conveyor having lower deformable rolls rotatable about associated axes at spaced intervals along the direction of conveyance, the forming station also including an upper deformable roll forming press located above the lower deformable roll forming conveyor in an opposed relationship to receive a heated glass sheet from the furnace, and the upper deformable roll forming press having upper deformable rolls rotatable about associated spaced axes at spaced intervals along the direction of conveyance between the axes of the lower deformable rolls;

the lower deformable rolls each including a flexible shaft and roll discs spaced along the flexible shaft, and the upper deformable rolls including roll discs;

an actuating mechanism that moves the lower deformable roll forming conveyor and the upper deformable roll forming press between flat shapes for receiving the heated glass sheet and curved shapes for forming the heated glass sheet;

a cooling station located downstream along the direction of conveyance from the forming station and including lower and upper quench heads for supplying quenching gas and also including a roll conveyor for conveying the formed glass sheet between the quench heads for cooling by the quenching gas supplied from the quench heads; and an adjustment mechanism for adjusting the lower and upper quench heads and the roll conveyor of the cooling station to provide different curvatures for difference curvatures of formed glass sheets to be cooled.

10. A method for forming glass sheets comprising:

conveying a glass sheet along a direction of conveyance through a heating chamber of a furnace for heating to a sufficiently high temperature to permit forming of the glass sheet;

transferring the heated glass sheet from the furnace to a forming station between a lower deformable roll forming conveyor and an upper deformable roll forming press that respectively have lower deformable rolls rotatable about associated axes at spaced intervals along the direction of conveyance and upper deformable rolls rotatable about associated axes at spaced intervals along the direction of conveyance between the axes of the lower deformable rolls; and moving the lower deformable roll forming conveyor and the upper deformable roll forming press between flat shapes at which the heated glass sheet is received from the furnace and curved shapes for forming the heated glass sheet.

11. A method for forming heated glass sheets as in claim 10 wherein the lower deformable rolls are rotatively driven and wherein the upper deformable rolls are undriven idler rolls.

12. A method for forming heated glass sheets as in claim 10 wherein the formed glass sheet is transferred from the forming station to a conveyor of a cooling station between lower and upper quench heads for supplying quenching gas that cools the glass sheet.

13. A method for forming heated glass sheets as in claim 10 wherein the lower and upper quench heads are adjustable to different curved shapes between different production jobs to permit cooling of different curved shapes of formed glass sheets.

14. A method for forming glass sheets comprising:

conveying a glass sheet along a direction of conveyance through a heating chamber of a furnace for heating to a sufficiently high temperature to permit forming of the glass sheet;

transferring the heated glass sheet from the furnace to a forming station between a lower deformable roll forming conveyor and an upper deformable roll forming press that respectively have lower deformable rolls rotatively driven about associated axes at spaced intervals along the direction of conveyance and undriven upper deformable rolls rotatable about associated spaced axes at spaced intervals along the direction of conveyance between the axes of the lower deformable rolls;

moving the lower deformable roll forming conveyor and the upper deformable roll forming press between flat shapes at which the heated glass sheet is received from the furnace and curved shapes for forming the heated glass sheet; and transferring the formed glass sheet from the forming station to a conveyor of a cooling station between lower and upper quench heads for supplying quenching gas that cools the glass sheet.

\* \* \* \* \*